United States Patent
Ramanathan et al.

(10) Patent No.: US 9,755,245 B2
(45) Date of Patent: Sep. 5, 2017

(54) CATALYST MATERIAL FOR FUEL CELL

(75) Inventors: Shriram Ramanathan, Manchester, CT (US); Laura Roen Stolar, South Windsor, CT (US)

(73) Assignee: Audi AG, Ingolstadt (DE)

( * ) Notice: Subject to any disclaimer, the term of this patent is extended or adjusted under 35 U.S.C. 154(b) by 167 days.

(21) Appl. No.: 14/113,223

(22) PCT Filed: Apr. 25, 2011

(86) PCT No.: PCT/US2011/033747
§ 371 (c)(1),
(2), (4) Date: Oct. 22, 2013

(87) PCT Pub. No.: WO2012/148376
PCT Pub. Date: Nov. 1, 2012

(65) Prior Publication Data
US 2014/0051008 A1 Feb. 20, 2014

(51) Int. Cl.
| | |
|---|---|
| *H01M 4/90* | (2006.01) |
| *H01M 8/1018* | (2016.01) |
| *B01J 21/18* | (2006.01) |
| *B01J 23/42* | (2006.01) |
| *B01J 37/02* | (2006.01) |
| *B01J 37/16* | (2006.01) |
| *H01M 4/88* | (2006.01) |

(Continued)

(52) U.S. Cl.
CPC .......... *H01M 4/9075* (2013.01); *B01J 21/18* (2013.01); *B01J 23/42* (2013.01); *B01J 37/024* (2013.01); *B01J 37/0242* (2013.01); *B01J 37/16* (2013.01); *H01M 4/885* (2013.01); *H01M 4/8817* (2013.01); *H01M 8/1007* (2016.02); *H01M 4/926* (2013.01); *H01M 2008/1095* (2013.01)

(58) Field of Classification Search
None
See application file for complete search history.

(56) References Cited

U.S. PATENT DOCUMENTS

| | | |
|---|---|---|
| 3,979,227 A | 9/1976 | Katz et al. |
| 4,536,488 A | 8/1985 | Wanke et al. |

(Continued)

FOREIGN PATENT DOCUMENTS

| | | |
|---|---|---|
| GB | 2 242 203 A | 9/1991 |
| JP | 61-197034 A | 9/1986 |

(Continued)

OTHER PUBLICATIONS

International Preliminary Report on Patentability for International Application No. PCT/US2011/033747 mailed on Nov. 7, 2013.

(Continued)

*Primary Examiner* — Guinever S Gregorio
(74) *Attorney, Agent, or Firm* — Seed IP Law Group LLP

(57) ABSTRACT

A method of forming a catalyst material includes coating agglomerates of catalyst support particles with an ionomer material. After coating the agglomerates of catalyst support particles, a catalyst metal precursor is deposited by chemical infiltration onto peripheral surfaces of the agglomerates of catalyst support particles. The catalyst metal precursor is then chemically reduced to form catalyst metal on the peripheral surfaces of the agglomerates of catalyst support particles.

7 Claims, 1 Drawing Sheet

(51) Int. Cl.
*H01M 8/1007* (2016.01)
*H01M 4/92* (2006.01)

(56) References Cited

U.S. PATENT DOCUMENTS

| | | |
|---|---|---|
| 2002/0015878 A1 | 2/2002 | Tsumura et al. |
| 2005/0026772 A1 | 2/2005 | Yasunaga et al. |
| 2006/0159980 A1* | 7/2006 | Pak et al. ................ 429/40 |
| 2009/0011320 A1 | 1/2009 | Senda |
| 2012/0237855 A1* | 9/2012 | Hucul ................ H01M 4/8817 |
| | | 429/532 |

FOREIGN PATENT DOCUMENTS

| | | |
|---|---|---|
| JP | 7-326365 A | 12/1995 |
| JP | 2000093809 | 4/2000 |
| JP | 2004-139789 A | 5/2004 |
| JP | 2005-190712 A | 7/2005 |
| JP | 2008-41498 A | 2/2008 |
| WO | 9518879 | 7/1995 |

OTHER PUBLICATIONS

International Search Report for PCT Application No. PCT/US2011/033747 completed on Mar. 20, 2012.
Extended European Search Report, mailed Sep. 2, 2014, for European Application No. 11864594.4-1359 / 2702625, 7 pages.

* cited by examiner

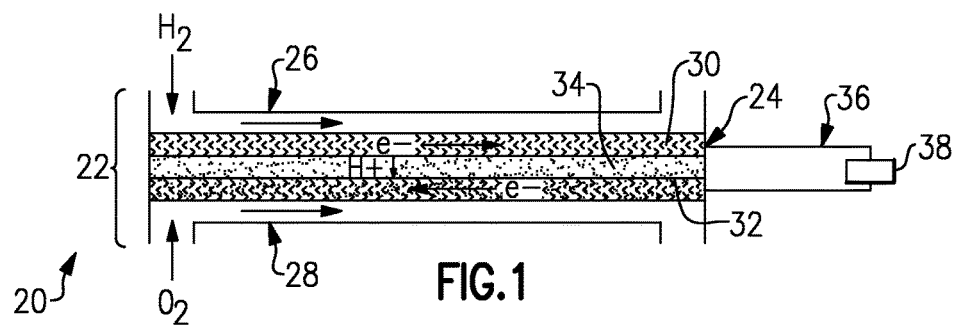
FIG.1
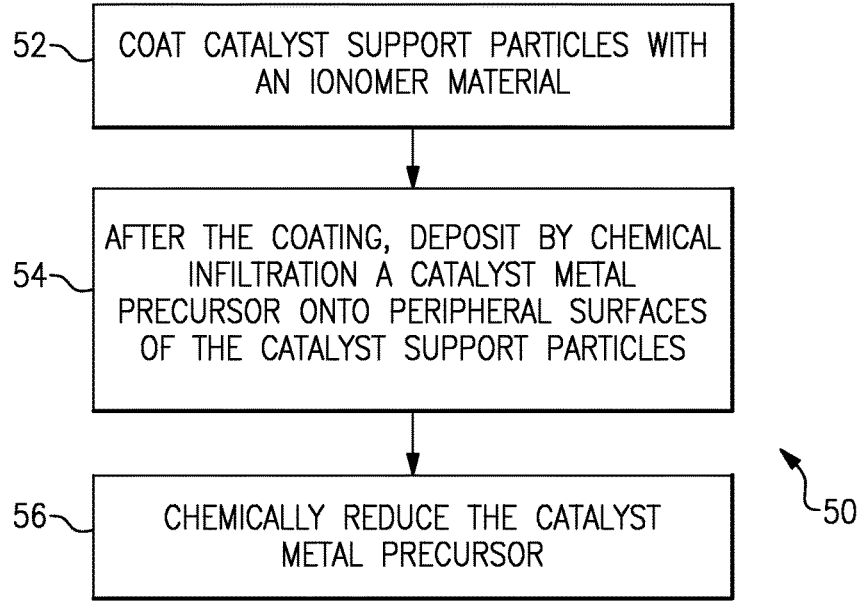
FIG.2
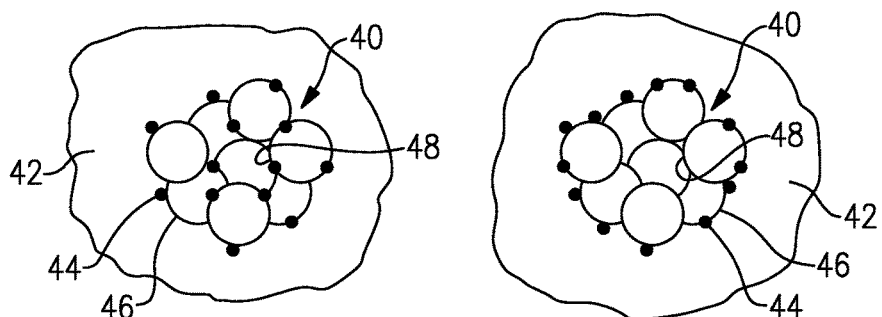
FIG.3
Prior Art
FIG.4

CATALYST MATERIAL FOR FUEL CELL

BACKGROUND

This disclosure relates to catalyst materials and, more particularly, to a method for targeted deposition of a catalyst metal.

Fuel cells and other types of devices commonly utilize electroactive materials. For instance, a typical fuel cell may include an anode catalyst layer, a cathode catalyst layer and an electrolyte between the anode and cathode catalyst layers for generating an electric current in a known electrochemical reaction between a fuel and an oxidant. The catalyst layers typically include a catalytic material, such as platinum, that is supported on carbon particles. However, the catalytic material is only active when it is accessible to protons, electrons and the respective reactant fuel or oxidant. Regions in the catalyst layers that are accessible to protons, electrons and the respective reactant are referred to as the three-phase boundary.

SUMMARY

Disclosed is a method of forming a catalyst material. The method includes coating agglomerates of catalyst support particles with an ionomer material. After coating the agglomerates of catalyst support particles, a catalyst metal precursor is deposited by chemical infiltration onto peripheral surfaces of the agglomerates of catalyst support particles. The catalyst metal precursor is then chemically reduced to form catalyst metal on the peripheral surfaces of the agglomerates of catalyst support particles.

In another aspect, an example fuel cell apparatus includes an electrolyte layer and first and second catalyst layers that are arranged on respective opposing sides of the electrolyte layer. At least one of the first or second catalyst layers includes agglomerates of catalyst support particles dispersed within an ionomer material and a catalyst metal deposited substantially on peripheral surfaces of the agglomerates of catalyst support particles with regard to non-peripheral surfaces within the agglomerates.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1 illustrates an example fuel cell apparatus.

FIG. 2 illustrates an example method of forming a catalyst material in a targeted deposition process.

FIG. 3 illustrates a prior art ionomer electrode material.

FIG. 4 illustrates an example ionomer electrode material according to the present disclosure.

DETAILED DESCRIPTION OF THE PREFERRED EMBODIMENT

FIG. 1 schematically illustrates selected portions of an example fuel cell 20. In this example, a single fuel cell unit 22 is shown. However, it is to be understood that multiple fuel cell units 22 may be stacked in a known manner in the fuel cell 20 to generate a desired amount of electric power. It is also to be understood that this disclosure is not limited to the arrangement of the example fuel cell 20, and the concepts disclosed herein may apply to other fuel cell arrangements or to other catalytic devices.

As shown, the fuel cell 20 includes an electrode assembly 24 arranged between an anode flow field 26 and a cathode flow field 28. For instance, the anode flow field 26 may deliver fuel, such as hydrogen gas, to the electrode assembly 24. Similarly, the cathode flow field 28 may deliver oxygen gas, such as air, to the electrode assembly 24. In this regard, the anode flow field 26 and the cathode flow field 28 are not limited to any particular structure, but may include channels or the like for delivering the reactant gases to the electrode assembly 24.

The electrode assembly 24 includes an anode catalyst layer 30 and a cathode catalyst layer 32. An electrolyte layer 34 is arranged between the anode catalyst layer 30 and the cathode catalyst layer 32 for conducting ions there between in an electrochemical reaction to generate an electric current. In some examples, the electrolyte layer 34 may be a polymer electrolyte membrane, a solid oxide electrolyte or other type of electrolyte suitable for sustaining the electrochemical reaction.

The hydrogen at the anode catalyst layer 30 dissociates into protons that are conducted through the electrolyte layer 34 to the cathode catalyst layer 32 and electrons that flow through an external circuit 36 to power a load 38, for example. The electrons from the external circuit 36 combine with the protons and oxygen at the cathode catalyst layer 32 to form a water byproduct.

As will be described in further detail below, the anode catalyst layer 30, the cathode catalyst layer 32 or both are ionomer electrodes. The ionomer electrodes include agglomerates 40 of catalyst support particles that are dispersed within an ionomer material 42. A catalyst metal 44 is deposited substantially on peripheral surfaces 46 of the agglomerates 40 with regard to non-peripheral surfaces 48 within the agglomerates 40 (see FIG. 4). As will also be described in further detail below, the ionomer electrodes disclosed herein are fabricated using a targeted deposition technique that deposits the catalyst metal 44 substantially on the peripheral surfaces 46 of the agglomerates 40 to thereby increase the amount of catalyst metal 44 at the three-phase boundary of the ionomer electrodes.

The anode catalyst layer 30, the cathode catalyst layer 32 or both may be fabricated using a method 50 of forming a catalyst material, as shown in FIG. 2. The method 50 of targeted deposition of the catalyst metal 44 generally includes a coating step 52, a deposition step 54 and a chemical reduction step 56. As shown, the coating step 52 includes coating agglomerates 40 of catalyst support particles with the ionomer material 42. After the coating in step 52, the deposition step 54 is used to deposit a catalyst metal precursor by chemical infiltration onto the peripheral surfaces 46 of the agglomerates 40 of catalyst support particles. In the reduction step 56, the catalyst metal precursor is chemically reduced to form the catalyst metal 44.

A comparative technique of forming ionomer electrode material results in a substantial amount of the catalyst metal 44 being deposited on non-peripheral surfaces 48 of the agglomerates 40 of catalyst support particles, as seen in FIG. 3. In the comparative technique, the catalyst metal 44 is predeposited on the individual catalyst support particles and then mixed with the ionomer material 42. During the mixing, the catalyst support particles form the agglomerates 40 such that a substantial amount of the catalyst metal 44 is located between adjacent catalyst support particles. The adjacent surfaces of the support particles constitute the non-peripheral surfaces 48 and such surfaces are not at the three-phase boundary as desired. As a result, much of the catalyst metal 44 that resides at the non-peripheral surfaces 48 is inactive within the device.

As will now be described, the method 50 of targeted deposition of the catalyst metal 44 deposits the catalyst metal 44 substantially on the peripheral surfaces 46 of the agglomerates 40, as shown in FIG. 4. In this case, at least a majority of the catalyst metal 44 resides on the peripheral surfaces 46. In a further example, the non-peripheral surfaces 48 of the agglomerates 40 are substantially free of the catalyst metal 44.

In one example, the coating step 52 includes mixing the catalyst support particles with an ionomer and a solvent. As an example, the ionomer may be a fluoropolymer, such as Nafion by E.I. Dupont USA. The solvent may be isopropyl alcohol, water, or a mixture thereof. The mixing coats the catalyst support particles with the ionomer material 42 and forms the agglomerates 40. The solvent is then removed and the resulting agglomerates 40 and ionomer material 42 that is coated on the agglomerates 40 is mixed with or suspended in sodium bicarbonate ($NaHCO_3$). The amount of sodium bicarbonate is controlled to establish a target pH level. For instance, the target pH level is between 8.5 and 9.0. The target pH level facilitates the coating of the catalyst support particles with the ionomer. That is, the ionomer adheres to the catalyst support particles at the targeted pH level.

Additionally, the sodium bicarbonate dopes the ionomer material 42, such as the disclosed fluoropolymer, with sodium ions. The sodium that is doped into the ionomer material 42 thermally stabilizes the ionomer material 42, as will be described below.

Next, in the deposition step 54, a catalyst metal precursor is deposited by chemical infiltration onto the peripheral surfaces 46 of the agglomerates 40. In one example, the catalyst metal precursor is deposited by mixing chloroplatinic acid $H_2PtCl_6 \cdot (H_2O)_6$ with the mixture of the catalyst support particles and sodium bicarbonate. A buffer, such as ammonium hydroxide, may be added to the mixture to control the pH to establish a target pH level. As an example, the target pH level during the deposition step 54 is 5.75-6.25.

The target pH level permits the chemical infiltration of the chloroplatinic acid (i.e., the precursor catalyst metal) through the ionomer material 42 that is coated onto the agglomerates 40 of catalyst support particles such that the catalyst metal precursor deposits onto the peripheral surfaces 46 of the agglomerates 40. Without being bound by any particular theory, it is hypothesized that the target pH range during the deposition step 54 opens channels within the ionomer material 42 that allows the infiltration of the catalyst metal precursor through the ionomer material 42 to the peripheral surfaces 46 of the agglomerates 40. That is, the target pH range opens up such channels to allow the deposition while pH ranges outside of the target pH range close the channels and preclude or substantially hinder deposition of the precursor catalyst metal.

Optionally, carbon monoxide gas may be bubbled through the mixture during the deposition step 54 to "poison" the catalyst metal precursor and thereby prevent concentrated depositions that might otherwise result in large agglomerates of the catalyst metal 44.

The mixture of the chloroplatinic acid, buffer, and the coated agglomerates 40 of catalyst support particles may be stirred for a predetermined amount of time. In one example, the mixture is magnetically stirred for approximately 30-60 minutes.

In a further example, the target pH level during the coating step 52 and the target pH level during the deposition step 54 are controlled to establish a target ratio. As an example, a ratio of the target pH level during the coating step 52 to the target pH level during the deposition step 54 (i.e., $pH_{deposition}$ divided by $pH_{coating}$) is between 0.5 and 3. In a further example based on the disclosed target pH levels above, the ratio is between 1.3 and 1.6.

After the deposition step 54, the catalyst metal precursor is chemically reduced in the reduction step 56. As an example, formaldehyde is added to the mixture of the chloroplatinic acid, buffer, and the coated catalyst support particles to reduce the catalyst metal precursor. The pH level of the mixture during the reduction step 56 is controlled to establish the pH of the mixture to be in a range of 5.5-6.0.

In one example, the formaldehyde is added at a controlled rate, such as 5 milliliters per minute, to promote uniform chemical reduction of the platinum of the catalyst metal precursor. Additionally, the amount of formaldehyde may be precalculated to correspond to the amount of chloroplatinic acid that was used. The reduction may be conducted over a predetermined amount of time, such as 1.5 hours.

After the chemical reduction, the synthesis is essentially complete and the mixture may be filtered to remove the catalyst material. The catalyst material may then be washed in water and/or ammonium bicarbonate and subsequently dried to form the catalyst material into the respective anode catalyst layer 30 and/or cathode catalyst layer 32 in a known manner.

After the washing and drying, the catalyst material may be heat treated at a temperature above 150° C./302° F. The heat treatment removes impurities from the catalyst metal 44 and thereby improves catalytic performance. The thermal stabilization of the ionomer material 42 from the sodium doping enables the heat treatment at the temperature above 150° C./302° F. and as high as 220° C. Without the sodium dopant, the ionomer material tends to degrade and render the catalyst material unsuitable for use in the fuel cell 20 or other catalytic device. After the heat treatment, the sodium dopant can be removed and replaced with hydrogen in an acid washing step. As an example, sulfuric acid may be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of forming a catalyst material, the method comprising:

coating agglomerates of catalyst support particles with an ionomer material, the coating of the agglomerates of catalyst support particles including mixing the catalyst support particles, the ionomer material, and sodium bicarbonate and establishing a first predetermined pH level of the mixture;

after the coating of the agglomerates of catalyst support particles with the ionomer material, depositing by chemical infiltration a catalyst metal precursor onto peripheral surfaces of the agglomerates of catalyst support particles, the depositing including mixing the coated agglomerates of catalyst support particles with chloroplatinic acid and establishing a second predetermined pH level of the mixture such that a ratio of the first predetermined pH level to the second predetermined pH level is between 1.3 and 1.6; and chemically reducing the catalyst metal precursor to form catalyst metal such that a majority of the catalyst metal resides on the peripheral surfaces of the agglomerates of catalyst support particles, the catalyst material comprising the ionomer material, the agglomerates of catalyst support particles and the catalyst metal.

2. The method as recited in claim 1, wherein the first predetermined pH level is within a predetermined range of 8.5-9.0.

3. The method as recited in claim 1, wherein the second predetermined pH level is within a predetermined range of 5.75-6.25.

4. The method as recited in claim 3, further comprising bubbling carbon monoxide gas through the mixture including the coated agglomerates and the chloroplatinic acid.

5. The method as recited in claim 1, wherein the chemically reducing includes using formaldehyde and establishing a pH level during the reducing to be 5.5-6.0.

6. The method as recited in claim 1, further comprising, after the chemically reducing, drying the catalyst material and heating the catalyst material at a temperature that is greater than 150° C., 302° F.

7. The method as recited in claim 6, further comprising washing the catalyst material in acid to remove sodium.

* * * * *